United States Patent
Mizukami

(10) Patent No.: US 11,381,321 B2
(45) Date of Patent: Jul. 5, 2022

(54) OPTICAL POWER SUPPLY SYSTEM

(71) Applicant: KYOCERA CORPORATION, Kyoto (JP)

(72) Inventor: Tatsuo Mizukami, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/488,300

(22) Filed: Sep. 29, 2021

(65) Prior Publication Data

US 2022/0021466 A1   Jan. 20, 2022

Related U.S. Application Data

(63) Continuation of application No. 17/442,628, filed as application No. PCT/JP2020/025129 on Jun. 26, 2020.

(30) Foreign Application Priority Data

Jul. 22, 2019 (JP) .............................. JP2019-134238
Jul. 22, 2019 (JP) .............................. JP2019-134241

(51) Int. Cl.
  *H04B 10/80* (2013.01)
  *H04B 10/25* (2013.01)
  *H04B 10/079* (2013.01)

(52) U.S. Cl.
  CPC ..... *H04B 10/806* (2013.01); *H04B 10/07955* (2013.01); *H04B 10/25* (2013.01); *H04B 10/807* (2013.01)

(58) Field of Classification Search
  CPC .................. H04B 10/806; H04B 10/25; H04B 10/07955; H04B 10/807; H04B 10/079; H02J 50/005; H02J 7/00032; H02J 50/30
(Continued)

(56) References Cited

U.S. PATENT DOCUMENTS 5,528,409 A    6/1996  Cucci et al.
8,600,241 B2 * 12/2013  Chan ................... H04B 10/807
                                                                398/171
(Continued)

FOREIGN PATENT DOCUMENTS

CN    102694658 A    9/2012
CN    103347293 A    10/2013
(Continued)

*Primary Examiner* — Abbas H Alagheband
(74) *Attorney, Agent, or Firm* — Hauptman Ham, LLP

(57) ABSTRACT

An optical power supply system includes a power sourcing equipment, a powered device, an information obtaining part and a power supply controller. The power sourcing equipment outputs feed light. The powered device converts the feed light into electric power. The electric power is supplied to a communicator. The information obtaining part obtains communication operation information on an operation status of communication that is performed by the communicator. Based on the obtained communication operation information, the power supply controller controls output of the feed light. The communicator is a wireless communicator that performs wireless communication. The communication operation information includes at least one of measured communication load information that is information on an actually measured communication load, potential communication load information that is information on a potential maximum communication load, and predicted communication load information that is information on a predicted communication load.

5 Claims, 10 Drawing Sheets

(58) Field of Classification Search
USPC .................................................. 398/79, 142
See application file for complete search history.

(56) References Cited

U.S. PATENT DOCUMENTS

| | | | |
|---|---|---|---|
| 9,197,329 B2 * | 11/2015 | Chan | H04B 10/807 |
| 10,455,497 B2 * | 10/2019 | Hagag | H04L 12/12 |
| 11,114,852 B2 * | 9/2021 | Blackwell, Jr. | H04L 12/413 |
| 2004/0227057 A1 * | 11/2004 | Tuominen | H04B 10/807 |
| | | | 250/221 |
| 2007/0201540 A1 | 8/2007 | Berkman | |
| 2011/0211829 A1 * | 9/2011 | Schimpe | H04B 10/07955 |
| | | | 398/33 |
| 2011/0278479 A1 * | 11/2011 | Chan | H02J 50/80 |
| | | | 250/551 |
| 2019/0097457 A1 * | 3/2019 | Hazani | H02H 1/0007 |

FOREIGN PATENT DOCUMENTS

| | | | | |
|---|---|---|---|---|
| CN | 104023346 A | | 9/2014 | |
| CN | 104333127 A | | 2/2015 | |
| CN | 106451825 A | | 2/2017 | |
| JP | H07-95325 A | | 4/1995 | |
| JP | 2009271731 A | | 11/2009 | |
| JP | 2009302752 A | | 12/2009 | |
| JP | 2010135989 A | | 6/2010 | |
| JP | 201933626 A | | 2/2019 | |
| JP | 2019033626 | * | 2/2019 | ............ Y02E 10/50 |
| JP | 201954423 A | | 4/2019 | |

* cited by examiner

OPTICAL POWER SUPPLY SYSTEM

CROSS-REFERECE TO RELATED APPLICATIONS

This application is a continuation of U.S. patent application Ser. No. 17/442,628 filed on Sep. 24, 2021, which is a National Phase of International Application No. PCT/JP2020/025129 filed Jun. 26, 2020, and claims priority based on Japanese Application Nos. 2019-134238 filed Jul. 22, 2019, and 2019-134241 filed Jul. 22, 2019, entire contents of which are incorporated here in reference.

TECHNICAL FIELD

The present disclosure relates to optical power supply.

BACKGROUND ART

Recently, there has been studied an optical power supply system that converts electric power into light (called feed light), transmits the feed light, converts the feed light into electric energy, and uses the electric energy as electric power.

There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

SUMMARY OF INVENTION

Problem to Solve

In optical power supply, further improvement of optical power supply efficiency is required. As one way therefor, achievement of efficient power supply according to the electric power load at the power receiving side is required.

Solution to Problem

An optical power supply system according to an aspect of the present disclosure includes:
a power sourcing equipment that outputs feed light;
a powered device that converts the feed light into electric power, wherein the feed light is from the power sourcing equipment, and the electric power obtained by the conversion by the powered device is supplied to a communicator;
an information obtaining part that obtains communication operation information on an operation status of communication that is performed by the communicator; and
a power supply controller that, based on the communication operation information obtained by the information obtaining part, controls output of the feed light from the power sourcing equipment.

An optical power supply system according to another aspect of the present disclosure includes:
a power sourcing equipment that outputs feed light;
an optical branching device to which the feed light from the power sourcing equipment is input and to which a plurality of powered devices that convert the feed light into electric power is connectable;
a detector that detects the number of powered devices connected to the optical branching device; and
a power supply controller that, based on the number of connected powered devices detected by the detector, controls output of the feed light from the power sourcing equipment.

DESCRIPTION OF EMBODIMENTS

Hereinafter, embodiments of the present disclosure will be described with reference to the drawings.

(1) Outline of System

First Embodiment

Figure 1:
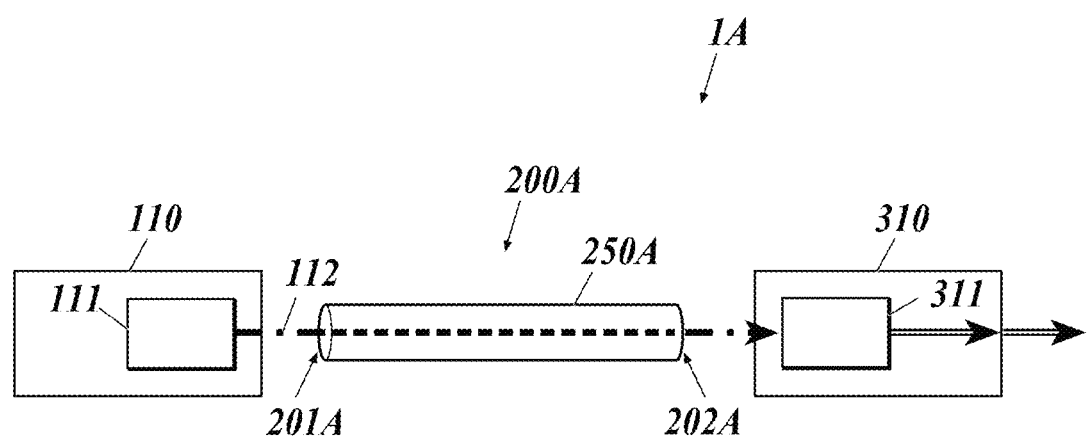
FIG. 1 is a block diagram of a power over fiber system according to a first embodiment of the present disclosure.

As shown in FIG. 1, a power over fiber (PoF) system 1A of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
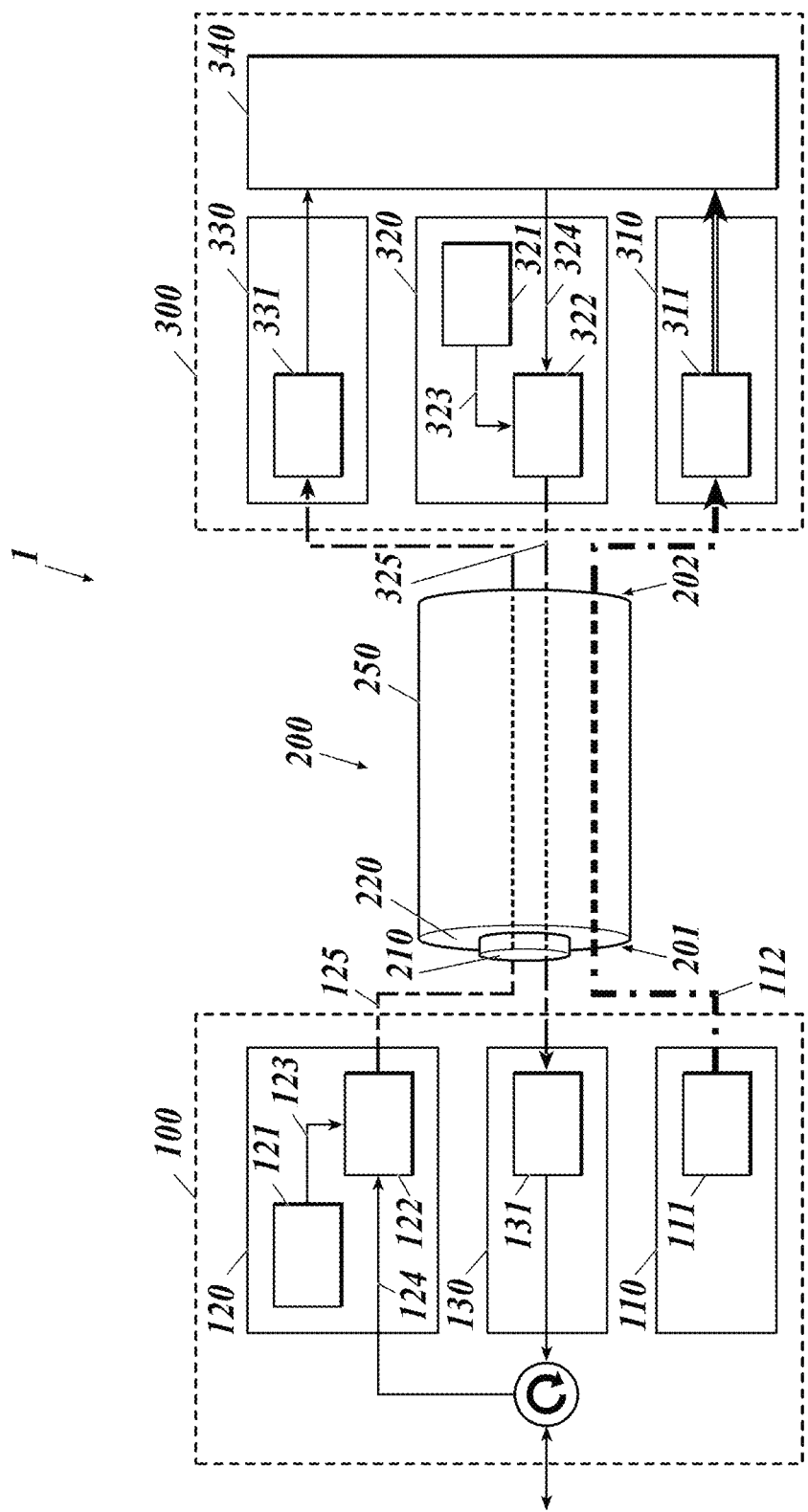
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 including a power sourcing equipment (PSE) 110; an optical fiber cable 200; and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
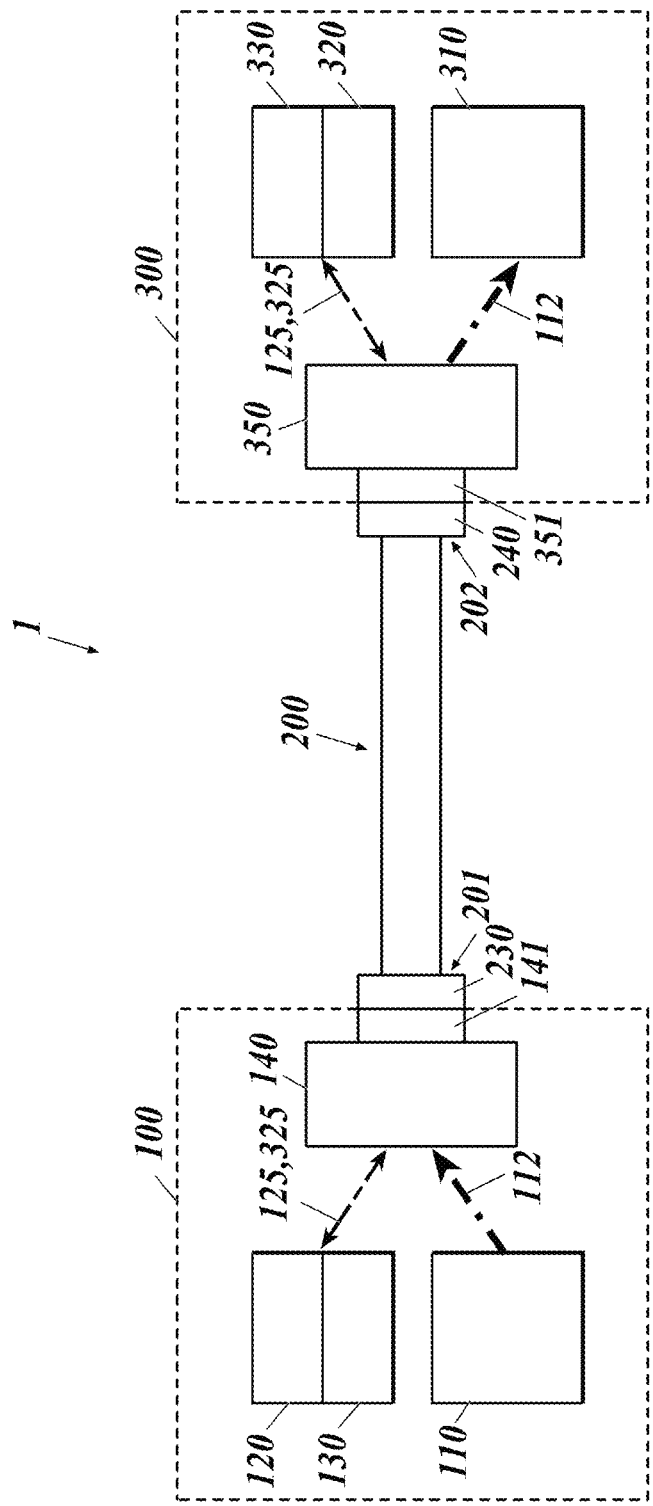
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125, 325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
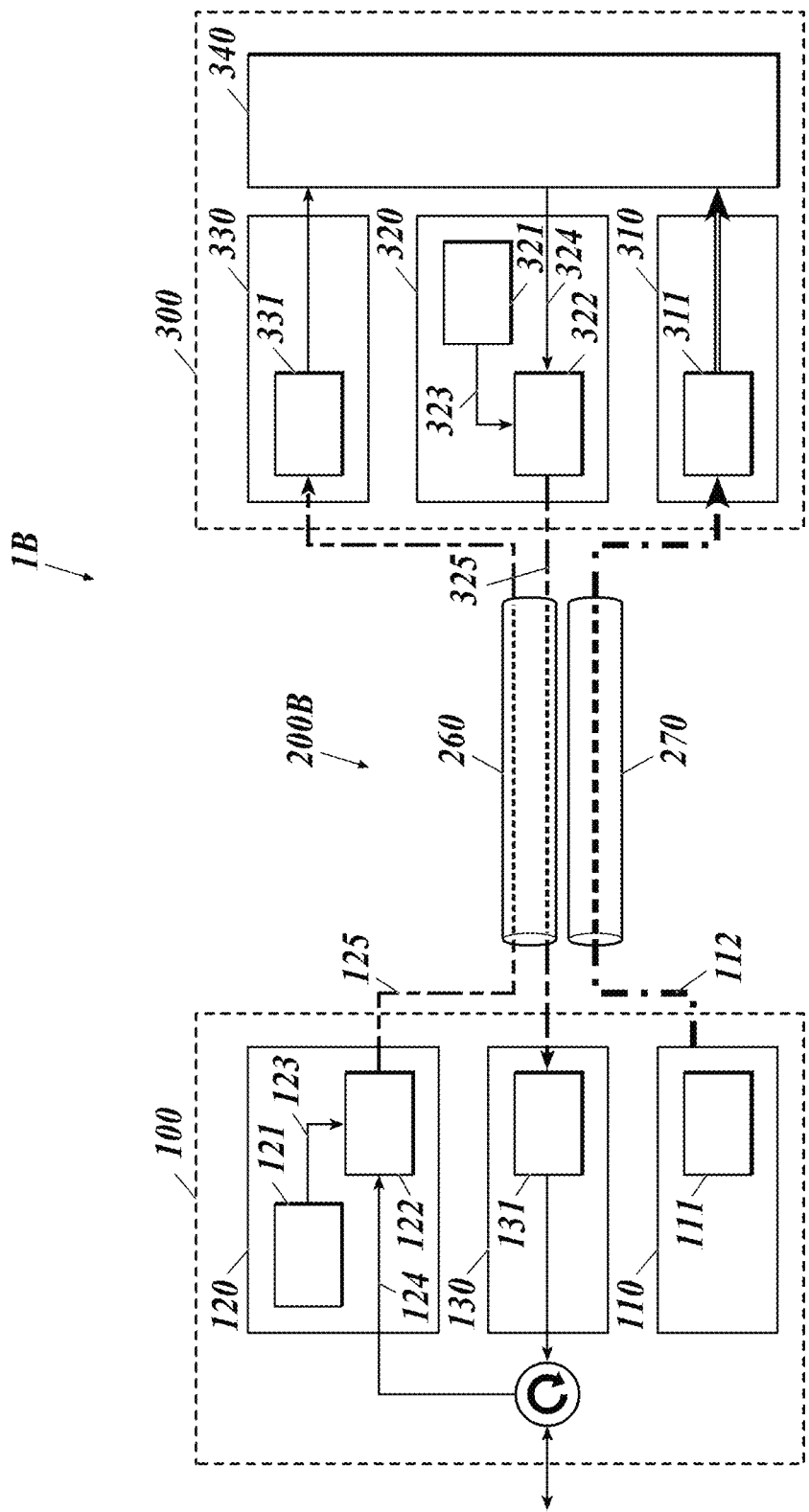
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Power Supply Controller

Next, a power supply controller that controls a power supply amount will be described.

Third Embodiment

Figure 5:
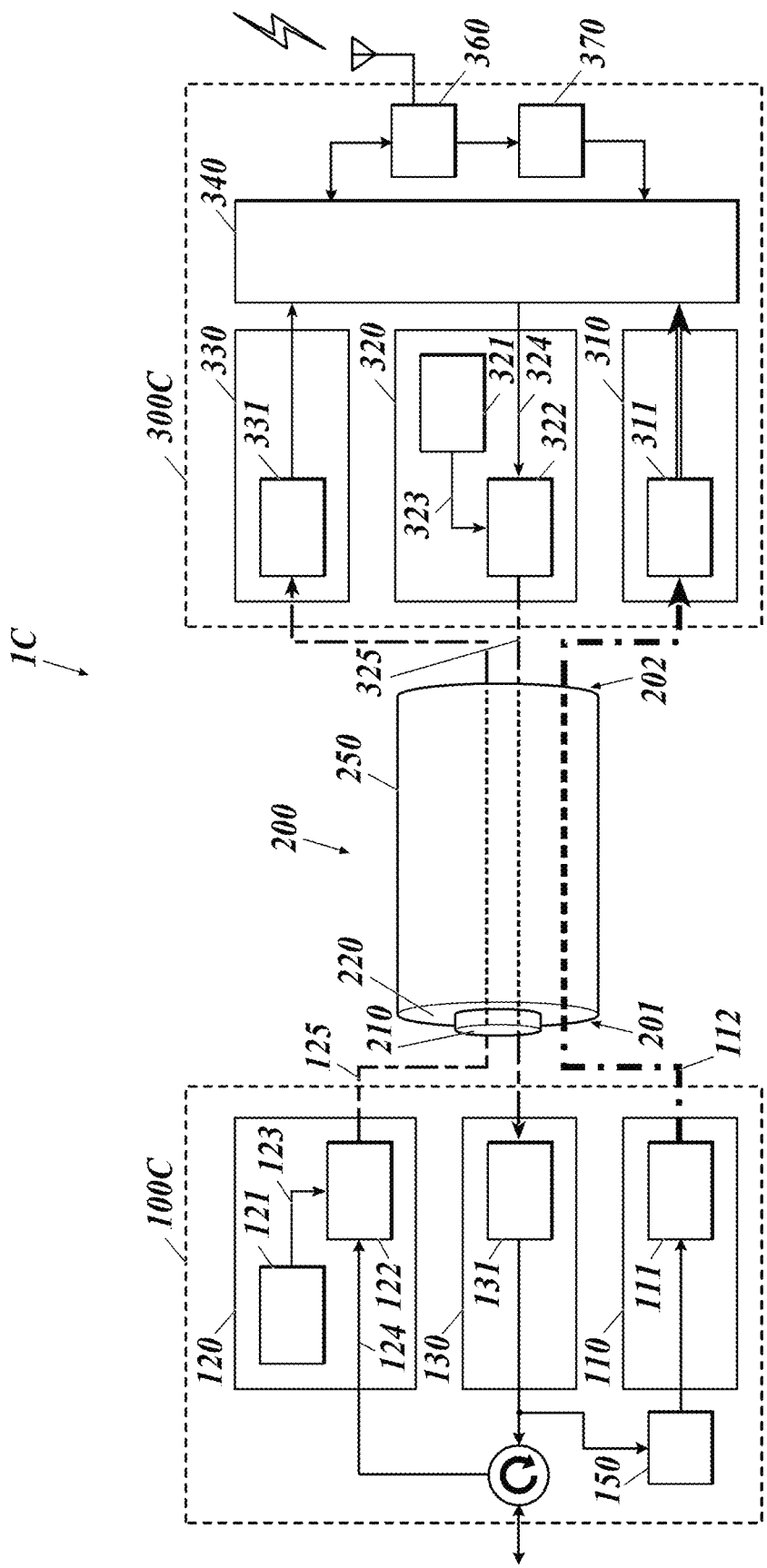
FIG. 5 is a block diagram of a power over fiber system according to a third embodiment of the present disclosure.

FIG. 5 is a block diagram of a power over fiber system according to a third embodiment to which a power supply controller is applied. In FIG. 5, the same components as those described above are denoted by the same reference signs, and detailed descriptions thereof are omitted.

As shown in FIG. 5, a power over fiber system 1C of the third embodiment includes a first data communication device 100C, an optical fiber cable 200 and a second data communication device 300C.

The second data communication device 300C includes, in addition to the powered device 310, the transmitter 320, the receiver 330 and the data processing unit 340, a wireless communicator 360 and a communication monitor 370. The second data communication device 300C corresponds to a wireless base station, for example.

The wireless communicator 360 performs wireless communication to transmit and receive data to and from a plurality of wireless communicators. The wireless communicator 360 transmits, by wireless communication, data received from the data processing unit 340, and also transmits data received by wireless communication to the data processing unit 340. The wireless communicator 360 consumes electric power corresponding to its communication load, and is driven by electric power supplied from the powered device 310.

The communication monitor 370 monitors the operation status of the wireless communication that is performed by the wireless communicator 360, and obtains communication operation information on this operation status.

The communication operation information is information on the communication load of the wireless communication. More specifically, the communication operation information includes at least one of measured communication load information, potential communication load information and predicted communication load information. The measured communication load information is information on the communication load actually measured, and includes the number of MIMO (Multiple-Input and Multiple-Output) streams, a using bandwidth and so forth of the wireless communication that is performed by the wireless communicator 360. The potential communication load information is information on the potential maximum communication load, and includes the number of active users that coverable by the wireless communication that is performed by the wireless communicator 360. The predicted communication load information is information on the communication load predicted, and includes information in which date-and-time information (at least one of a date, a day of the week, and time) is associated with a communication load that is expected to be at the time, such as the amount of the communication load for a time period (e.g. the communication load is small during nighttime, the communication load is large during daytime, etc.). The predicted communication load information may include information on use of event venues (date and time of use, an expected number of participants, etc.) where the communication load is expected to increase, within the communication range. The communication monitor 370 may record the actual communication load (e.g. communication volume) every day and create or update the predicted communication load information on the basis of this record.

The communication monitor 370 transmits the obtained communication operation information to the data processing unit 340. The data processing unit 340 puts the received communication operation information in the transmission data 324 and outputs the transmission data 324 to the modulator 322 of the transmitter 320. The modulator 322 modulates the laser light 323 on the basis of the transmission data 324, thereby outputting the signal light 325 containing the communication operation information to the first data communication device 100C through the optical fiber cable 200.

The first data communication device 100C includes, in addition to the power sourcing equipment 110, the transmitter 120 and the receiver 130, a power supply controller 150.

The power supply controller 150 obtains the communication operation information from the signal light 325 output from the photodiode 131 of the receiver 130. Then, on the basis of the obtained communication operation information, the power supply controller 150 controls output of the feed light 112 from the power sourcing equipment 110 (semiconductor laser 111).

Details thereof are as follows. If the power supply controller 150 obtains the measured communication load information (the number of MIMO streams, a using bandwidth, etc.) as the communication operation information, the power supply controller 150 adjusts the output of the feed light 112 on the basis of the ratio of the measured communication load to the maximum value (the maximum number of streams, the maximum bandwidth, etc.). If the power supply controller 150 obtains the potential communication load information (the number of active users coverable, etc.) as the communication operation information, the power supply controller 150 adjusts the output of the feed light 112 on the basis of the maximum communication volume assumed from the potential communication load information. If the power supply controller 150 obtains the predicted communication load information as the communication operation information, the power supply controller 150 obtains the communication load predicted for the current date and/or time from the predicted communication load information, and adjusts the output of the feed light 112 on the basis of this communication load. These multiple types of the communication operation information may be prioritized in advance to be used for the adjustment of the output (e.g. the measured communication load information is given the highest priority, etc.).

Thus, the output of the power sourcing equipment 110 is adjusted so as to correspond to the communication load of the wireless communicator 360, by extension, to the electric power load of the powered device 310. That is, in a conventional power supply system, a power sourcing equipment supplies certain (maximum) electric power to a powered device regardless of the electric power load of the powered device, and hence surplus electric power is consumed wastefully when the electric power load of the powered device is low, but in the power over fiber system 1C of this embodiment, the output of the power sourcing equipment 110 is adjusted so as to correspond to the electric power load of the powered device 310. Hence, unlike the conventional system, efficient power supply according to the electric power load at the power receiving side can be achieved.

The configuration of the third embodiment is applicable to the power over fiber system shown in FIG. 4. In this case, the first data communication device 100 and the second data communication device 300 shown in FIG. 4 are replaced by the first data communication device 100C and the second data communication device 300C, respectively.

Figure 6:
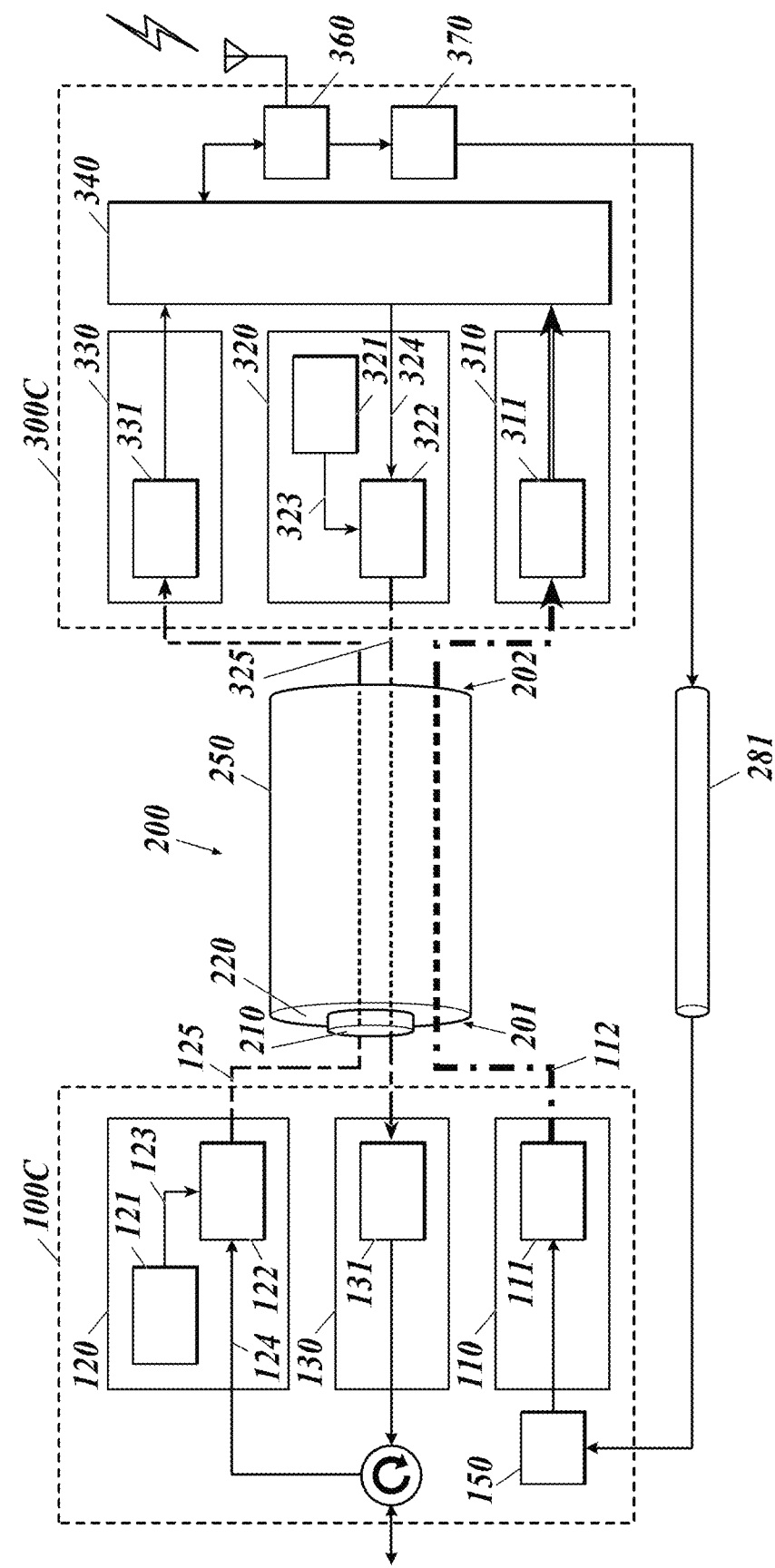
FIG. 6 is a block diagram of a modification of the power over fiber system according to the third embodiment of the present disclosure.

In the power over fiber system 1C of the third embodiment, as shown in FIG. 6, the communication operation information may be transmitted from the communication monitor 370 of the second data communication device 300C to the power supply controller 150 of the first data communication device 100C through a transmission path 281 that is different from the optical fiber cable 200. In this case, the communication monitor 370 may be an external device independent of the second data communication device 300C.

Fourth Embodiment

Figure 7:
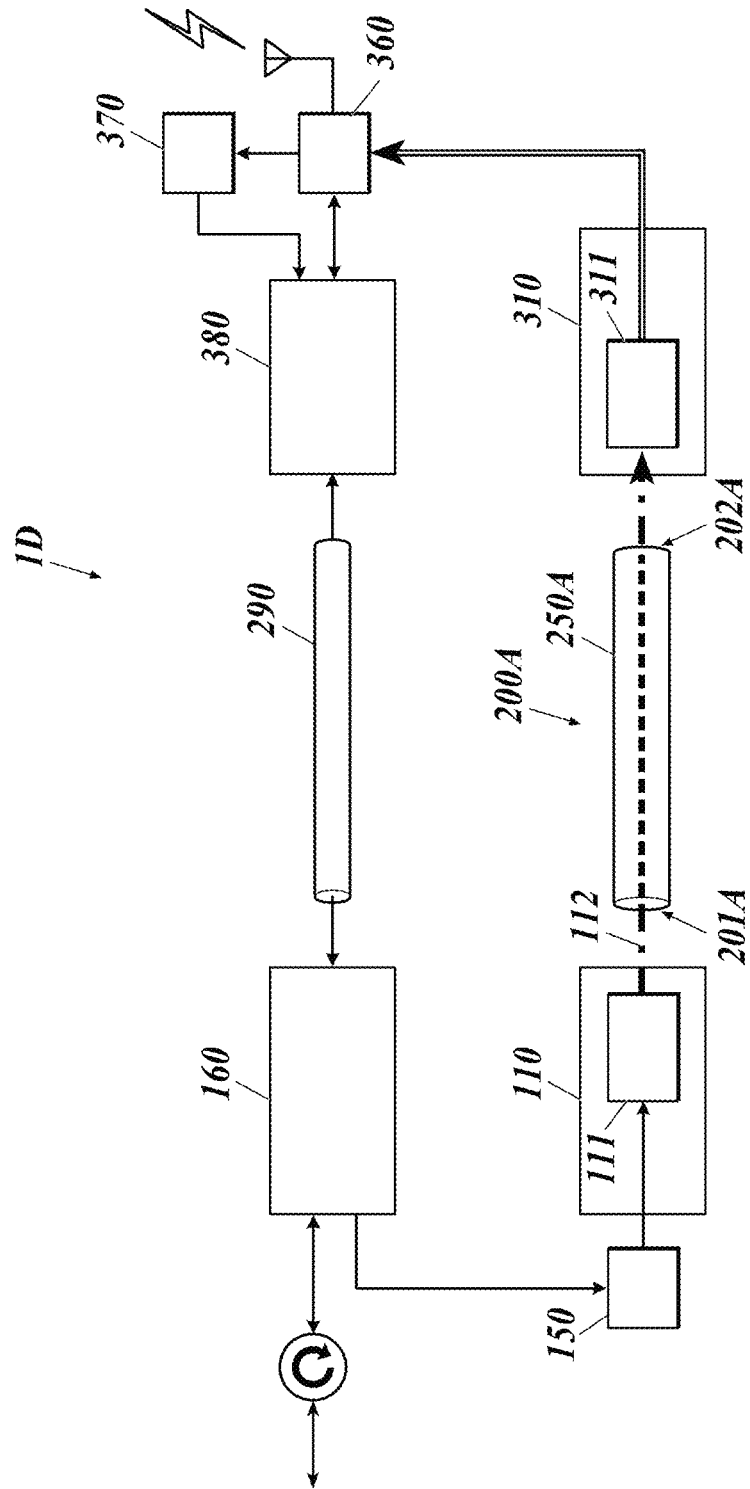
FIG. 7 is a block diagram of a power over fiber system according to a fourth embodiment of the present disclosure.

FIG. 7 is a block diagram of a power over fiber system according to a fourth embodiment to which a power supply controller is applied. In FIG. 7, the same components as those described above are denoted by the same reference signs, and detailed descriptions thereof are omitted.

As shown in FIG. 7, a power over fiber system 1D of the fourth embodiment is different from the power over fiber system 1C of the third embodiment, mainly in that a communication system is separate from a power supply system.

The communication system of the power over fiber system 1D includes a first communicator 160, a communication cable 290, a second communicator 380, a wireless communicator 360 and a communication monitor 370.

The first communicator 160 and the second communicator 380 perform data communication with one another through the communication cable 290. The wireless communicator 360 performs wireless communication with a plurality of wireless communicators.

The wireless communicator 360 transmits, by wireless communication, data received from the second communicator 380, and also transmits data received by wireless communication to the second communicator 380. The wireless communicator 360 consumes electric power corresponding to its communication load, and is driven by electric power supplied from the powered device 310.

The communication monitor 370 monitors the operation status of the wireless communication that is performed by the wireless communicator 360, and obtains the communication operation information on this operation status. The communication monitor 370 transmits the obtained communication operation information to the second communicator 380. The second communicator 380 transmits the received communication operation information to the first communicator 160 in the same manner as other transmission data.

The power supply system of the power over fiber system 1D includes a power sourcing equipment 110, an optical fiber cable 200A and a powered device 310, and is configured in the same manner as the power over fiber system 1A of the first embodiment. The output of the power sourcing equipment 110 is controlled by a power supply controller 150.

The power supply controller 150 obtains, from the first communicator 160, the communication operation information transmitted from the second communicator 380. Then, on the basis of the obtained communication operation information, the power supply controller 150 controls output of the feed light 112 from the power sourcing equipment 110 (semiconductor laser 111). The communication operation information may be transmitted from the communication monitor 370 to the power supply controller 150 through a transmission path that is different from the communication cable 290.

Thus, as in the third embodiment, the output of the power sourcing equipment 110 is adjusted so as to correspond to the communication load of the wireless communicator 360, by extension, to the electric power load of the powered device 310. Hence, unlike the conventional system, in which a power sourcing equipment supplies certain (maximum) electric power to a powered device regardless of the electric power load of the powered device, efficient power supply according to the electric power load at the power receiving side can be achieved.

Fifth Embodiment

Figure 8:
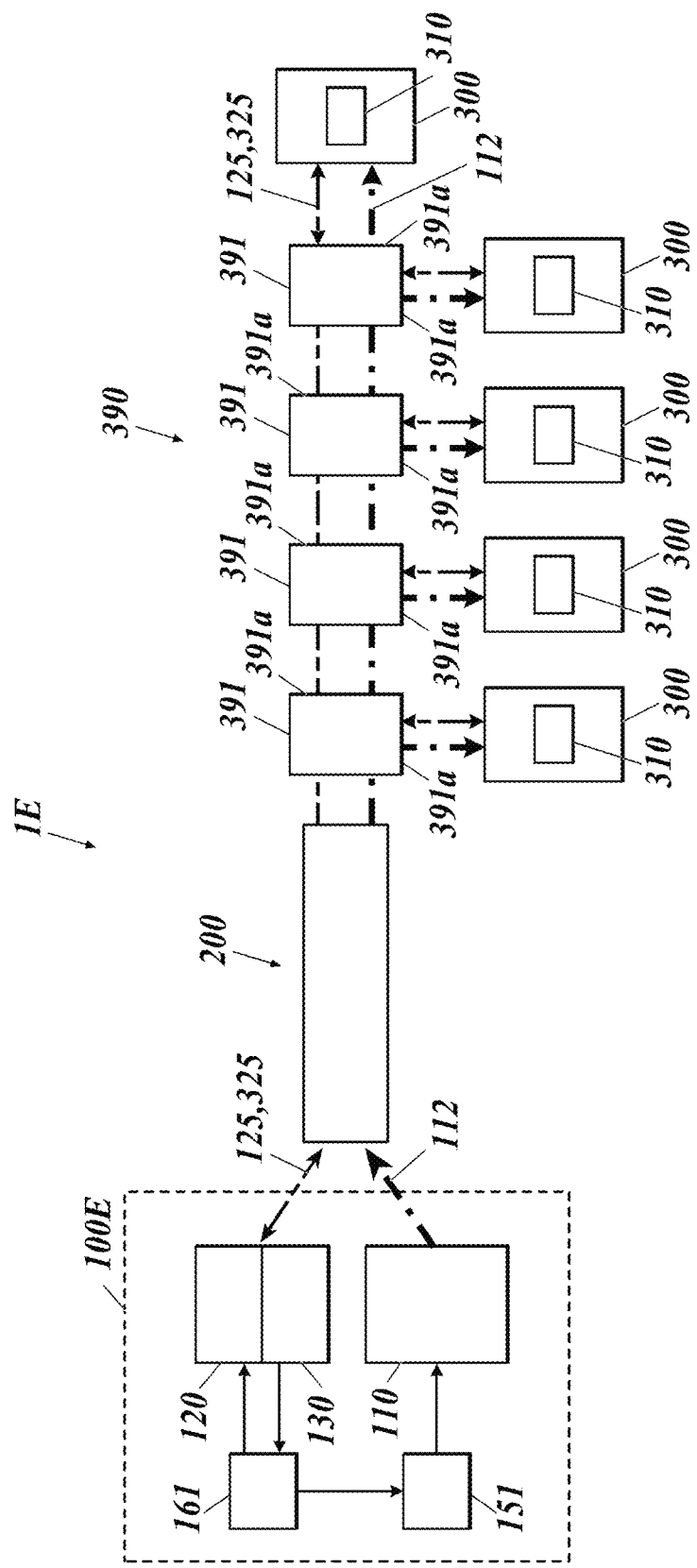
FIG. 8 is a block diagram of a power over fiber system according to a fifth embodiment of the present disclosure.

FIG. 8 is a block diagram of a power over fiber system according to a fifth embodiment to which a power supply controller is applied. In FIG. 8, the same components as those described above are denoted by the same reference signs, and detailed descriptions thereof are omitted.

As shown in FIG. 8, a power over fiber system 1E of the fifth embodiment includes a first data communication device 100E at the power supplying side, an optical fiber cable 200, and an optical power supply network 390 at the power receiving side.

The optical power supply network 390 can perform optical communication with the first data communication device 100E at the power supplying side (or within the optical power supply network 390) while receiving power supply from the first data communication device 100E. The optical power supply network 390 corresponds to, for example, an IoT (Internet of Things) system. The optical power supply network 390 of this embodiment includes a plurality of optical splitters (optical branching devices) 391 connected to the optical fiber cable 200 in series. Each optical splitter 391 has at least two connection ports 391a. To (and from) each connection port 391a, another optical splitter 391 or a second data communication device 300 is connectable (and disconnectable). Each optical splitter 391 splits, at a certain ratio, the signal light and the feed light transmitted from the first data communication device 100E through the optical fiber cable 200 for the optical splitter(s) 391 and/or the second data communication device(s) 300 connected thereto.

In this embodiment, each second data communication device 300 corresponds to, for example, a network camera or a network sensor. When a second data communication device 300 detects its connection to an optical splitter 391, the second data communication device 300 can perform data communication by the signal light 125, 325 and receive power supply by the feed light 112 (can be driven by the electric power into which the powered device 310 converts the feed light 112). The number of second data communication devices 300 (powered devices 310) connectable to the optical power supply network 390 is not specifically limited.

The optical power supply network 390 is configured such that a plurality of second data communication devices 300 (powered devices 310) are connectable to each optical branching device to which the feed light 112 from the power sourcing equipment 110 is input. Hence, for example, a single optical splitter 391 may be capable of splitting the signal light and the feed light for a plurality of second data communication devices 300 directly. Further, optical branching devices other than optical splitters may be used to split the signal light and the feed light.

The first data communication device 100E includes, in addition to the power sourcing equipment 110, the transmitter 120 and the receiver 130, a load detector 161 and a power supply controller 151 as a power supply controller.

The load detector 161 detects the number of second data communication devices 300 (powered devices 310) connected to the optical splitters 391 as the electric power load in the optical power supply network 390 at the power receiving side.

More specifically, the load detector 161 transmits signals to addresses that are assigned in advance to respective second data communication devices 300, and detects whether the second data communication devices 300 are connected to the optical splitters 391 by presence or absence of return signals therefrom. The load detector 161 detects the number of connected second data communication device 300 (powered devices 310) as the total number of the detections, and outputs the number thereof to the power supply controller 151. The signals are transmitted and received as the signal light 125, 325 through the oscillator 120 and the receiver 130. The address of each second data communication device 300 may be a unique address assigned thereto in advance or an address assigned when the second data communication device 300 is connected to the optical power supply network 390, for example.

The load detector 161 performs this detection process at the startup of the system and also regularly while the system is in operation.

The load detector 161 may detect connected powered devices 310 on the basis of signals from the power receiving side.

More specifically, when a second data communication device 300 is connected to an optical splitter 391, the second data communication device 300 or the optical splitter 391 detects the connection and outputs a signal for notifying the connection to the power supplying side. When receiving the notifying signal, the load detector 161, as described above, transmits a signal(s) for detecting the second data communication device 300, and detects whether the second data communication device 300 is connected to the optical splitter 391 by presence or absence of a return signal therefrom. The connection of the second data communication device 300 and the optical splitter 391 may be detected physically, for example, by a connection connector, or may be detected from a switch operation on a switch or the like that user operates when connecting these, the switch being provided on the second data communication device 300 or the optical splitter 391.

The power supply controller 151 controls output of the feed light 112 from the power sourcing equipment 110 (semiconductor laser 111) on the basis of information on the number of connected powered devices 310 input from the load detector 161. For example, the power supply controller 151 has, in advance, correlation data between the number of connected powered devices 310 and the power supply amount needed for the number thereof, adjusts the output of the power sourcing equipment 110 by using this data.

Thus, the output of the power sourcing equipment 110 is adjusted so as to correspond to the electric power load in the optical power supply network 390 at the power receiving side. That is, in a conventional power supply system, a power sourcing equipment supplies certain (maximum) electric power to the power receiving side regardless of the electric power load at the power receiving side, and hence surplus electric power is consumed wastefully when the electric power load at the power receiving side is low, but in the power over fiber system 1E of this embodiment, the output of the power sourcing equipment 110 is adjusted so as to correspond to the electric power load at the power receiving side. Hence, unlike the conventional system, efficient power supply according to the electric power load at the power receiving side can be achieved.

Figure 9:
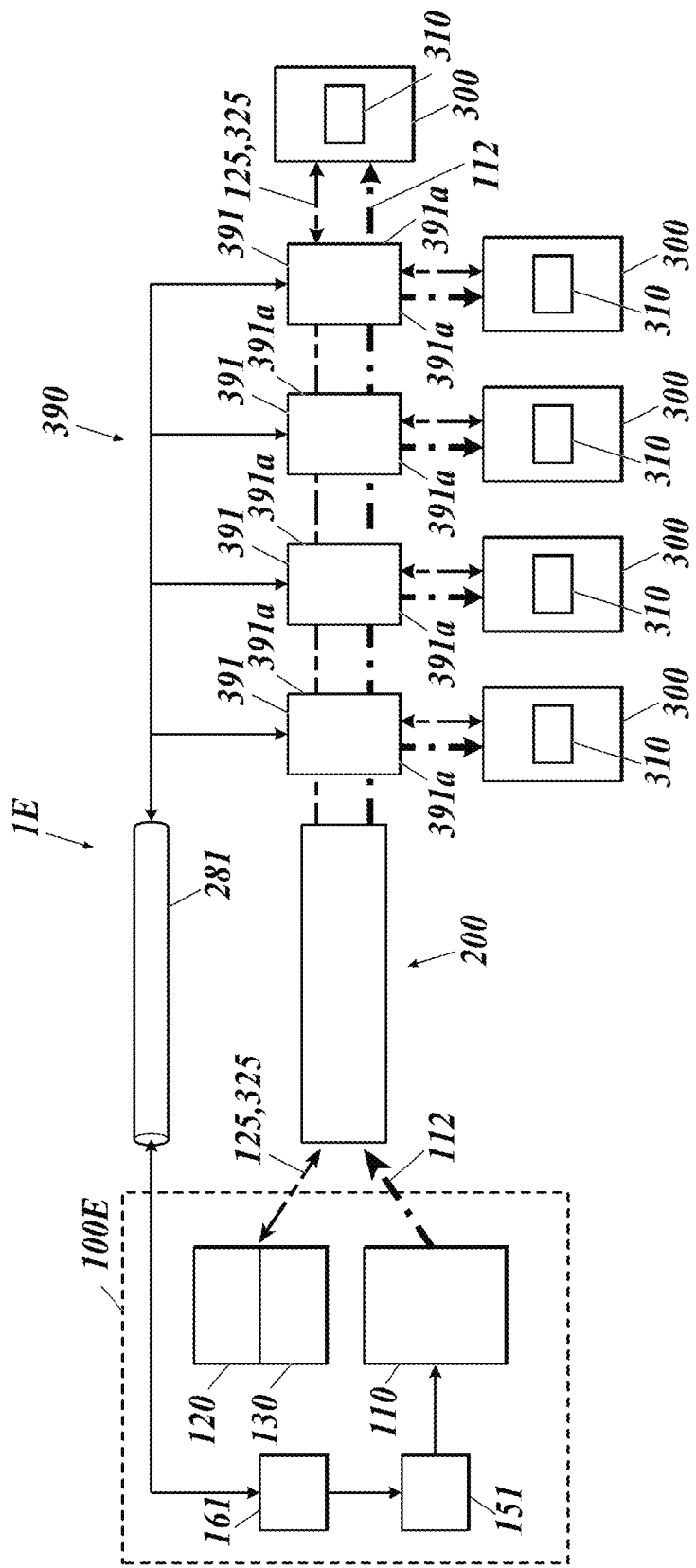
FIG. 9 is a block diagram of a modification of the power over fiber system according to the fifth embodiment of the present disclosure.

In the power over fiber system 1E of the fifth embodiment, as shown in FIG. 9, the signals for detecting connected powered devices 310 may be transmitted and received through a transmission path 281 that is different from the optical fiber cable 200.

Further, as in the power over fiber system shown in FIG. 4, in the power over fiber system 1E of the fifth embodiment, an optical fiber that transmits signal light and an optical fiber that transmits feed light may be provided separately.

Sixth Embodiment

Figure 10:
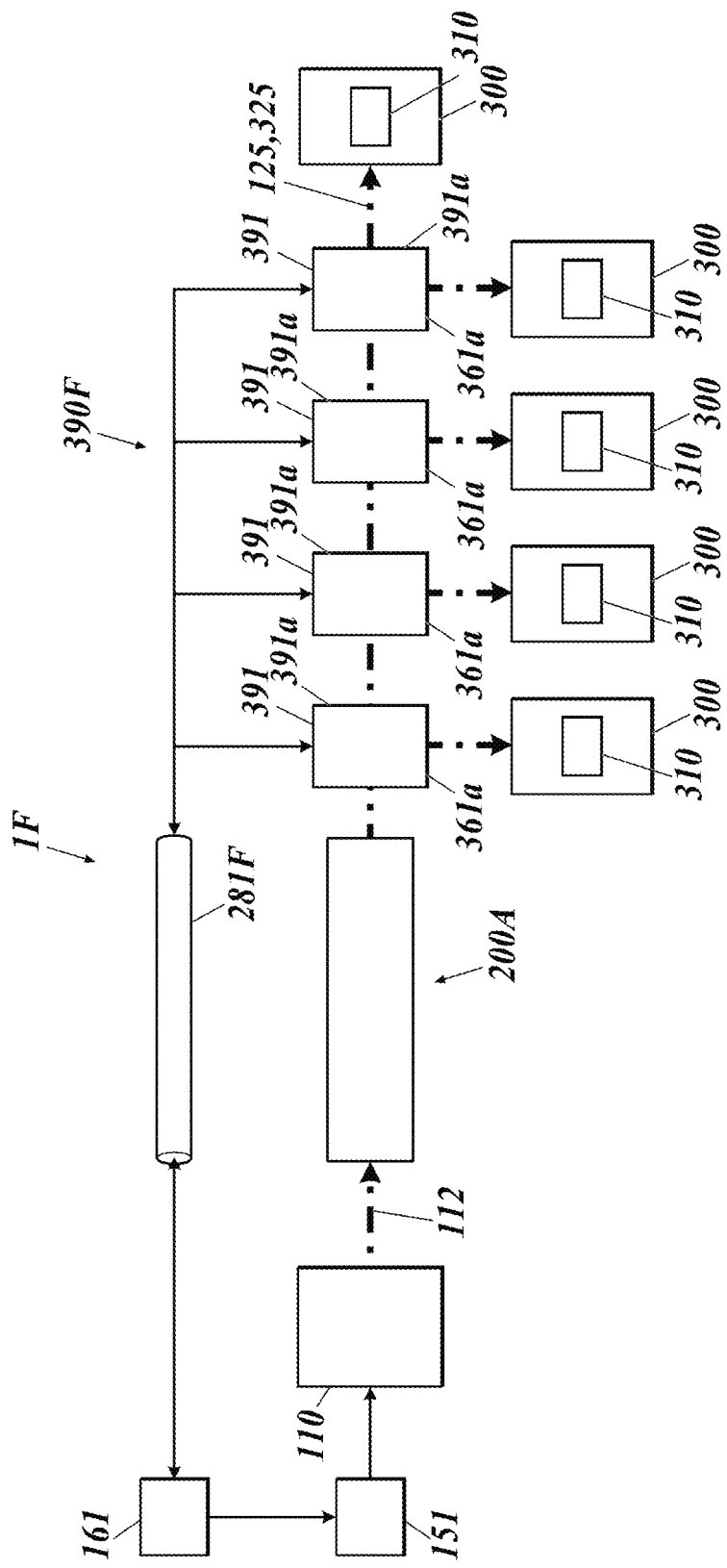
FIG. 10 is a block diagram of a power over fiber system according to a sixth embodiment of the present disclosure.

FIG. 10 is a block diagram of a power over fiber system according to a sixth embodiment to which a power supply controller is applied. In FIG. 10, the same components as those described above are denoted by the same reference signs, and detailed descriptions thereof are omitted.

As shown in FIG. 10, a power over fiber system 1F of the sixth embodiment is different from the power over fiber system 1E of the fifth embodiment, mainly in that an optical power supply network has a power supply system only. However, the power over fiber system 1F may have a not-shown communication system independent of the power supply system.

The power over fiber system 1F includes a power sourcing equipment 110, an optical fiber cable 200A and an optical power supply network 390F. The optical power supply network 390F includes a plurality of optical splitters 391 connected to the optical fiber cable 200A in series. To each optical splitter 391, a second data communication device(s) 300 (powered device 310) is connectable. In the optical power supply network 390F, to the second data communication devices 300 connected to the optical splitters 391, optical power is supplied from the power sourcing equipment 110 through the optical fiber cable 200A.

The output of the power sourcing equipment 110 is controlled by a power supply controller 151.

The power supply controller 151 obtains information on the number of connected powered devices 310 from the load detector 161. The load detector 161 detects the number of connected powered devices 310 on the basis of signals transmitted and received to and from the optical splitters 391 through a transmission path 281F, and outputs information thereon to the power supply controller 151. The power supply controller 151 controls output of the feed light 112 from the power sourcing equipment 110 (semiconductor laser 111) on the basis of the obtained information on the number of connected powered devices 310.

Thus, as in the fifth embodiment, the output of the power sourcing equipment 110 is adjusted so as to correspond to the electric power load in the optical power supply network 390 at the power receiving side. Hence, unlike the conventional system, in which a power sourcing equipment supplies certain (maximum) electric power to a powered device(s) regardless of the electric power load of the powered device(s), efficient power supply according to the electric power load at the power receiving side can be achieved.

Although some embodiments of the present disclosure have been described above, these embodiments are made for purposes of illustration and example only. The present invention can be carried out in various other forms, and each component may be omitted, replaced or modified/changed within a range not departing from the scope of the present invention.

For example, in the third and fourth embodiments, the electric power obtained by the conversion by the powered device 310 is supplied to the wireless communicator 360 that performs wireless communication. However, the target to which the electric power is supplied may be any communicator. For example, the target may be a communicator that performs not wireless communication but wired communication.

INDUSTRIAL APPLICABILITY

As described above, an optical power supply system according to the present invention is useful for achieving efficient power supply according to the electric power load at the power receiving side.

The invention claimed is:

1. An optical power supply system, comprising:
a power sourcing equipment that outputs feed light;
an optical branching device to which the feed light from the power sourcing equipment is input and to which a plurality of powered devices that convert the feed light into electric power is connectable;
a detector that detects the number of powered devices connected to the optical branching device;
a power supply controller that, based on the number of connected powered devices detected by the detector, controls output of the feed light from the power sourcing equipment; and
an optical fiber cable that transmits the feed light from the power sourcing equipment to the optical branching device,
wherein the detector is provided at a power supplying side of the optical fiber cable, and
wherein the detector outputs a signal to the optical branching device, and detects whether a powered device of the powered devices is connected to the optical branching device by presence or absence of a return signal therefrom, thereby detecting the number of connected powered devices.

2. The optical power supply system according to claim 1, wherein the detector regularly performs a process of detecting the number of connected powered devices.

3. The optical power supply system according to claim 1 comprising a first data communication device including the power sourcing equipment,
wherein, to the optical branching device, the feed light and signal light are input from the first data communication device, and
wherein, to the optical branching device, a plurality of second data communication devices including the powered devices and performing optical communication with the first data communication device by the signal light are connectable.

4. The optical power supply system according to claim 3, wherein the detector and the power supply controller are provided in the first data communication device.

5. An optical power supply system, comprising:
a power sourcing equipment that outputs feed light;
an optical branching device to which the feed light from the power sourcing equipment is input and to which a plurality of powered devices that convert the feed light into electric power is connectable;
a detector that detects the number of powered devices connected to the optical branching device;
a power supply controller that, based on the number of connected powered devices detected by the detector, controls output of the feed light from the power sourcing equipment;
an optical fiber cable that transmits the feed light from the power sourcing equipment to the optical branching device; and
a connection detecting part that is provided at a power receiving side of the optical fiber cable, and when detecting that a powered device of the powered devices is connected to the optical branching device, transmits, to the detector, a notifying signal notifying the detection,
wherein the detector is provided at a power supplying side of the optical fiber cable, and
wherein when receiving the notifying signal from the connection detecting part, the detector outputs a signal to the optical branching device, and detects whether the powered device of the powered devices is connected to the optical branching device by presence or absence of a return signal therefrom, thereby detecting the number of connected powered devices.

* * * * *